United States Patent [19]

Huff et al.

[11] 4,384,863

[45] May 24, 1983

[54] VARIABLE SPEED BELT DRIVE

[75] Inventors: Robert O. Huff; Edward F. Krome, Jr.; Gebus Barnsfather, all of Columbus, Ind.

[73] Assignee: Reliance Electric Company, Columbus, Ind.

[21] Appl. No.: 183,627

[22] Filed: Sep. 2, 1980

[51] Int. Cl.³ ............................................. F16H 55/56
[52] U.S. Cl. ....................................... 474/28; 474/18
[58] Field of Search .................... 474/16, 18, 28, 51, 474/94

[56] References Cited

U.S. PATENT DOCUMENTS

| | | | |
|---|---|---|---|
| 2,288,114 | 6/1942 | Smith | 474/28 |
| 2,851,894 | 9/1958 | Seyfarth | 474/16 |
| 2,877,528 | 3/1959 | Long | 474/28 |
| 3,418,863 | 12/1968 | Landau | |
| 3,451,283 | 6/1969 | Rattunde | |
| 3,478,611 | 11/1969 | Venne et al. | 474/16 |
| 3,552,223 | 1/1971 | Glasson et al. | |
| 3,600,961 | 8/1971 | Rattunde et al. | |
| 3,715,930 | 2/1973 | Beliveau et al. | 474/16 |
| 4,152,947 | 5/1979 | van Deursen | |
| 4,161,894 | 7/1979 | Glacosa | |

FOREIGN PATENT DOCUMENTS

| | | | |
|---|---|---|---|
| 1154679 | 9/1963 | Fed. Rep. of Germany | 474/8 |
| 12201 | of 1911 | United Kingdom | 474/28 |
| 3383 | of 1912 | United Kingdom | 474/28 |
| 772340 | 8/1955 | United Kingdom | |
| 804708 | 11/1956 | United Kingdom | |
| 1434228 | 12/1973 | United Kingdom | |

*Primary Examiner*—Kenneth Dorner
*Attorney, Agent, or Firm*—Marmaduke A. Hobbs

[57] ABSTRACT

A variable speed belt drive in which the axially moveable sheave flange is connected to the drive shaft by a flexible element which performs the function of transmitting the torque from the shaft to the axially moveable flange, and which defines a fluid pressure chamber for applying a variable pressure to the moveable flange for moving the flange axially on the shaft as the pressure in the chamber is varied by the operation of a control device. The flexible element may be an annular member having a generally U-shaped configuration with inwardly extending side walls, one of the side walls being connected to the flange and the other side wall being connected to a flange-like member rigidly mounted on the shaft. Passages are provided through the shaft to connect the chamber with a source of controlled pressure. The hub of the moveable flange is preferably not connected by any direct means, such as keys or splines, to the shaft but, except for the flexible element and related structure, is free to rotate relative to the shaft, and the shaft preferably has a smooth cylindrical surface at the section over which the moveable flange hub moves.

19 Claims, 4 Drawing Figures

VARIABLE SPEED BELT DRIVE

The conventional variable speed belt drives have a pair of sheaves and a belt interconnecting the sheaves in which one of the flanges on at least one of the sheaves is mounted on an axially moveable hub and is adjustable toward and away from the other flange. The hub is mounted on a shaft, and a keying device, such as a key and key ways, interconnects the flange, hub and shaft and prevents relative rotation therebetween. The adjustable sheave is varied by an operator or in response to a control signal and the other sheave automatically adjusts itself to accommodate the adjustment made in the first sheave. In a modification of this basic type, one of the sheaves is variable and the other is moved relative to the adjustable sheave to compensate for variations in the effective belt length when the adjustment in the speed is made. These variable speed drives often operate for extended periods of time under heavy loads, and are constantly subjected to excessive wear, particularly in the axially slidable sheave parts involved in the adjustment for different speeds. As a result of these prolonged adverse operating conditions, notching of the key and a substantial amount of fretting occur in the parts subjected to the sliding contact, ultimately interfering with the proper operation and adjustment of the sheaves and necessitating the eventual replacement of the affected parts or of the complete sheave. The sliding parts of the sheave normally most affected by the fretting and wear under the aforementioned conditions consist of the shaft of the drive sheave and the hub slidable thereon, the hub usually being keyed to the shaft for rotation therewith and, when in proper operating condition, being freely moveable axially on the shaft. However, the adverse operating conditions may cause roughness and binding between the key in the shaft and the contacting sliding portion of the hub, so that the sliding movement between the two parts is restrained to the extent that optimum operation of the variable pitch sheave is not possible even under normal operating conditions. It is therefore one of the primary objects of the present invention to provide a variable speed drive having adjustable pitch sheaves with an axially moveable hub, which can effectively and readily be adjusted to obtain a desired operating speed under adverse operating conditions, and which is so constructed and arranged that the sliding hub will continue to operate under the adverse conditions without the sliding surfaces becoming scored, corroded or otherwise damaged or subjected to excessive wear.

In the variable speed belt drives, various types of mechanisms and systems have been used for adjusting the moveable flange of the variable pitch sheave or sheaves. These include mechanical types, manually operated or power driven, or hydraulic types in which a cylinder and piston mounted axially with respect to the flange are supplied with hydraulic fluid through the shaft on which the sheave is mounted. In both the mechanical and hydraulic types of prior adjustment mechanisms, the moveable flange is keyed to the shaft and is adapted to move axially on the shaft in response to changes in the setting on the adjustment mechanism therefor. These adjustment mechanisms and systems function satisfactorily under normal operating conditions while the drives are in good condition, but they often become unreliable or inoperable from fretting and scoring of the shaft and keys. In order to overcome this difficulty, plastic bushings disposed between the shaft and the hub of the moveable flange, and in some instances along the keys, have been used; however, the basic reason for the adverse condition developing along the keys is not eliminated by these bushings, although the problem may be somewhat alleviated. Further, the hydraulic system for adjusting the moveable flange is often relatively complicated and difficult to maintain in optimum operating condition, free from hydraulic fluid leaks, particularly in the vicinity of the moveable flange. It is a further object of the invention to provide an adjustment for the moveable flange of one of the sheaves of a variable speed belt drive, which includes a pneumatic device for controlling the position of the moveable flange and which performs the additional function of interconnecting the shaft and moveable flange in operating relationship.

Another object of the invention is to provide a variable pitch sheave which will operate over extended periods of time without fretting occurring on the relatively slidable surfaces of the shaft and sliding hub involved in the adjustment of the pitch of the sheave, and which will maintain optimum operating performance over extended periods in adverse operation conditions.

A further object of the invention is to provide in a variable pitch sheave, the combination of a shaft and an axially moveable hub mounted thereon in which wear, fretting and the like between those parts in sliding contact are prevented or minimized, even under adverse operating conditions, thereby maintaining the sheave in optimum operating condition regardless of the loads encountered throughout the normal operating range of the drive.

Another object is to provide a variable pitch sheave of the aforementioned type which can be easily fabricated, assembled and installed, using standard equipment and tools, and which can thereafter be readily serviced and repaired in the field, using easily installed and assembled parts and subassemblies.

Still a further object of the invention is to provide a variable pitch sheave which is so constructed and designed that the parts thereof will withstand long continued operation with minimal servicing and without developing any adverse condition, such as vibration or hunting, which would interfere with the operation of the drive, thereby eliminating frequent replacement of parts or the complete unit.

The present invention involves the use of a fluid operated device, preferably consisting of a flexible torsion device of annular shape disposed around the shaft of the variable speed belt drive adjacent the moveable flange thereof, for performing the dual function of controlling the axial position of the moveable flange and, at the same time, of coupling the same flange to the shaft on which it is mounted. A system which is responsive to some predetermined operating condition or a preset speed, controls the operation of the fluid operated device to move the flange to the position required to obtain the desired performance of the drive. The fluid operated device is so constructed and designed that, when coupled to the shaft and moveable flange, the torque is transmitted between the shaft and flange without a key or other element directly connecting the two components. However, the device is capable of use merely as the coupling element between the shaft and flange or merely as a fluid controlled element for adjusting the moveable flange axially on the shaft.

Objects and advantages of the present variable speed drive, in addition to those recited hereinbefore, will become apparent from the following description and accompanying drawings, wherein.

Figure 1:
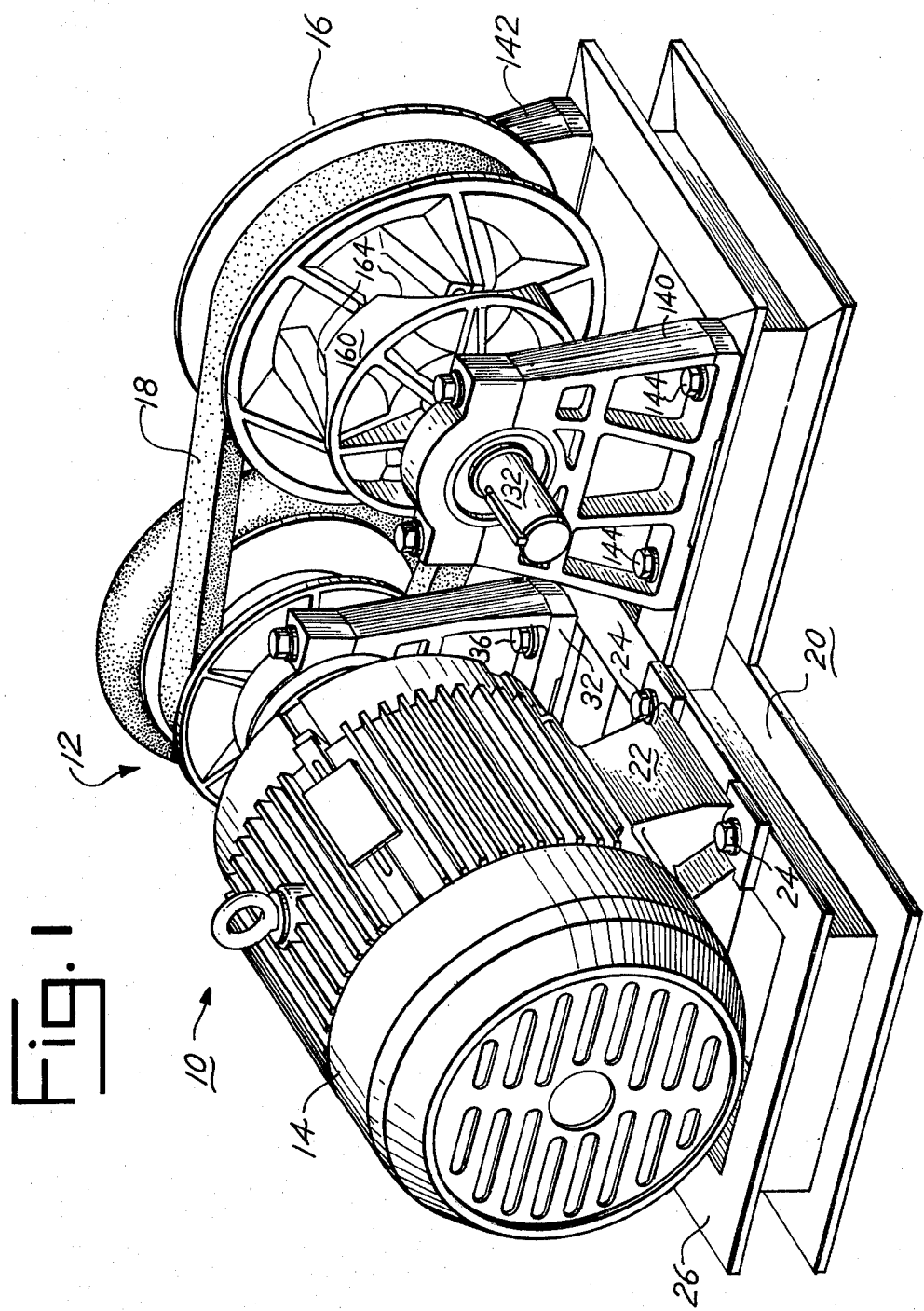
FIG. 1 is a perspective view of the variable speed belt drive embodying the present invention, showing the motor, two variable sheaves and a belt interconnecting the sheaves.
Figure 2:
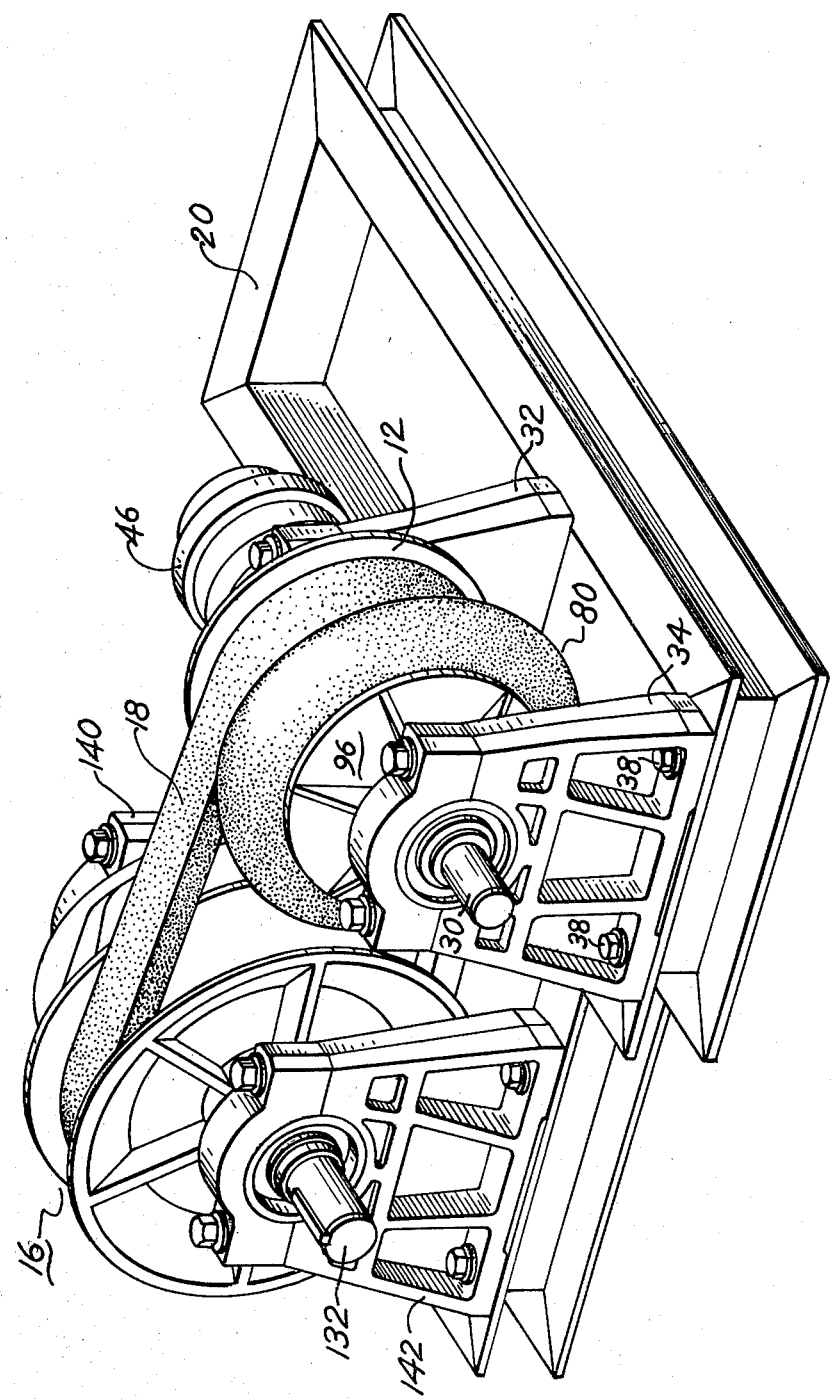
FIG. 2 is a perspective view of the present variable speed belt drive as seen from the side opposite the side shown in FIG. 1, with the motor for driving the sheaves omitted.

Referring more specifically to the drawings, and to FIG. 1 in particular, numeral 10 indicates generally the present variable speed belt drive having a variable speed sheave assembly 12, an electric motor 14 for driving the sheave assembly 12, a variable speed sheave assembly 16 adapted to be connected to the equipment to be driven by the variable speed drive, and a V-belt 18 trained on the sheaves of the two assemblies for transmitting the power from the sheave assembly 12 to sheave assembly 16. The motor and two sheave assemblies are mounted on a base 20 which forms a unitary structure of the three principal components. The motor may be considered conventional for the purpose of the present invention and has a base 22 secured to the drive base 20 by a plurality of bolts 24 extending downwardly through the motor base and through a flange 26 on the upper side of drive base 20. Since the motor is conventional and various makes and models can be used in the drive, further description of the motor will not be given herein.

Figure 3:
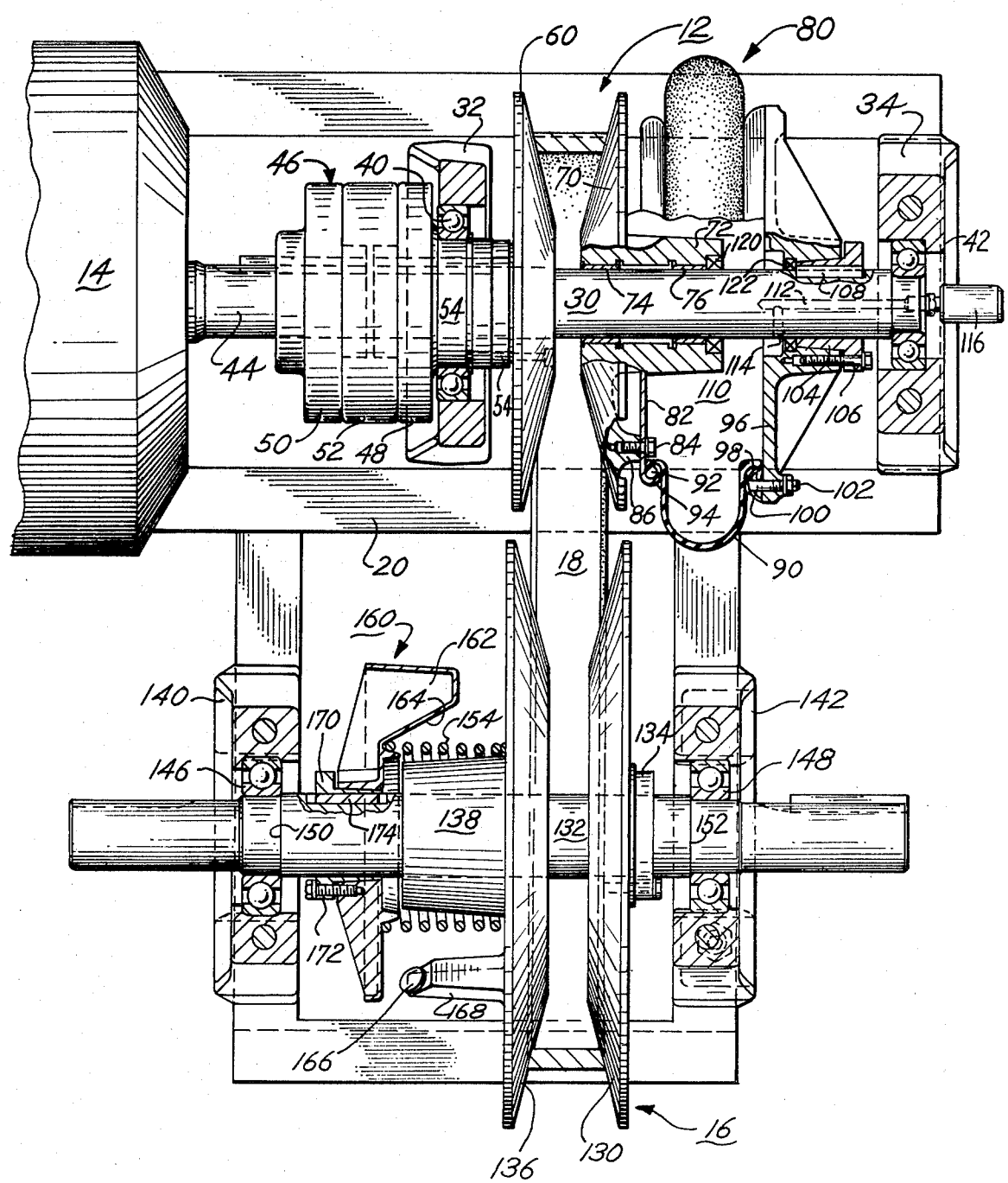
FIG. 3 is a top plan and partial cross sectional view of the variable speed belt drive shown in FIGS. 1 and 2, showing the sheaves in one torque output relationship.
Figure 4:
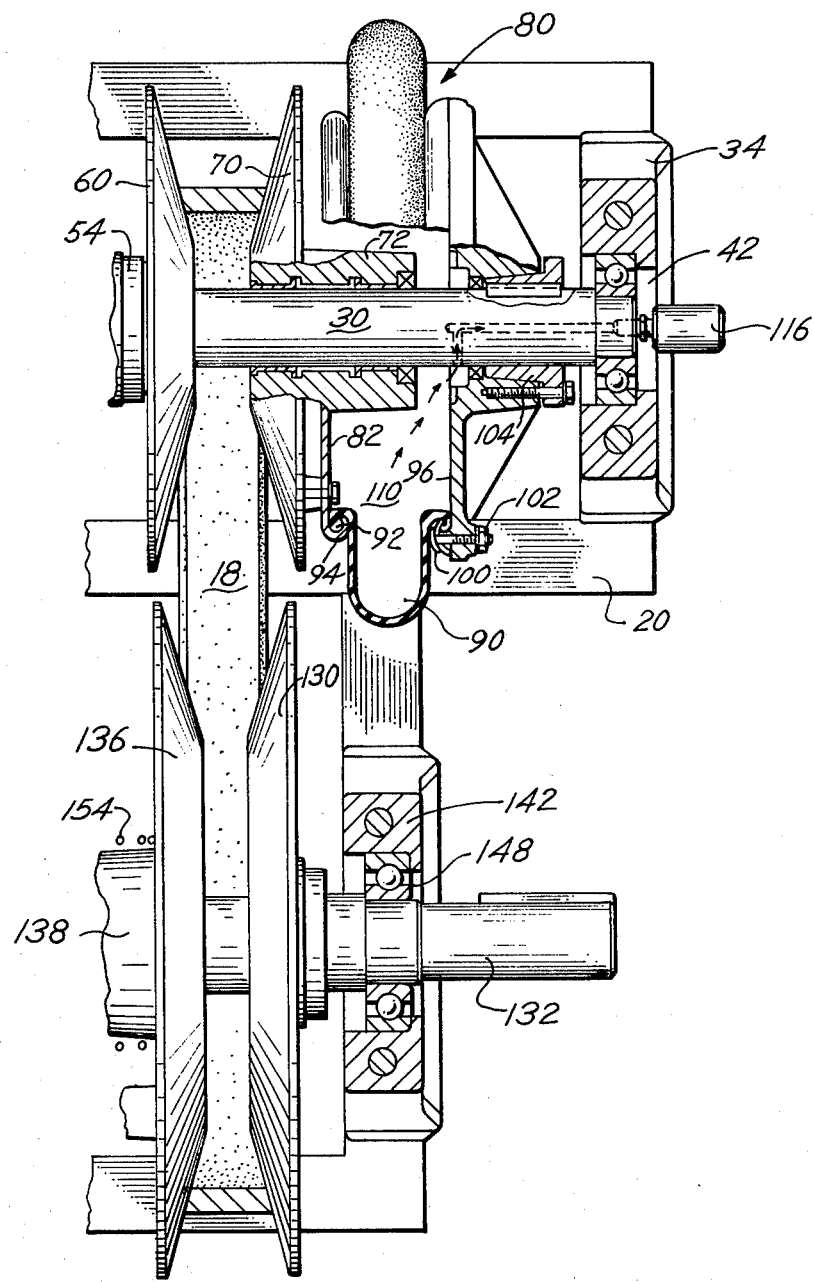
FIG. 4 is a top plan and cross sectional view similar to that shown in FIG. 3, but showing the sheaves in a different torque output relationship.

The construction of the sheave assembly 12 is best seen in FIGS. 3 and 4, consisting of a shaft 30 journaled in pillow blocks 32 and 34 secured by bolts 36 and 38 of the two pillow blocks, extending downwardly through the lower part of the respective pillow blocks and through upper flange 26 of base 20, thereby securing the two pillow blocks firmly to the base. The pillow block 32 contains a ball bearing 40, and pillow block 34 contains ball bearing 42, for shaft 30 which is connected to electric motor 14 by a coupling 46 having a flange 48 connected to the left hand end of shaft 30, as viewed in FIG. 3, a flange 50 connected to the motor shaft 44, and a flexible element 52 interconnecting the two coupling flanges for transmitting the torque from the motor to the shaft and for compensating for any minor misalignments which may be present between shafts 30 and 44. A bushing 54 is mounted securely to shaft 30 and connected directly to flange 48 and is journaled in bearing 40 for rotation with shaft 30. A fixed flange 60 of the sheave is secured to the bushing and rotates with the shaft as the two are driven by motor 14 through coupling 46. As far as the present invention is concerned, the manner in which the shaft is coupled to the motor and the flange is mounted onto the shaft is not material, and the flange can be mounted directly on the shaft without the bushing 54 shown in the drawings. The variable flange 70 of the sheave assembly 12 is connected to hub 72 which is mounted on shaft 30 and is preferably provided with low friction bushings 74 and 76 so that the sheave will move with little resistance from friction along shaft 30 as the pitch of the sheave is varied in accordance with power output requirements.

The sheave flange 70 and hub 72 are moved axially along shaft 30 by a fluid operated device 80 connected on one side to flange 70 by a plate 82 and a plurality of screws 84 extending through the plate into bosses 86 on the outside surface of moveable flange 70. A flexible element 90 of elastomeric material is connected on the inner side to plate 82 by an annular head 92 disposed in an annular groove 94 on the plate. The opposite side of flexible element 90 is connected to a plate 96 by an annular bead 98 clamped to the periphery of plate 96 by an annular clamping ring 100 secured to the periphery of the plate by a plurality of screws 102 spaced around the periphery of plate 96. Plate 96 is rigidly secured to shaft 30 by tapered bushing 104 seated in a tapered hub of the plate and secured therein by a plurality of screws 106 extending through the flange on the bushing into the hub of the plate 96, thereby being secured to the shaft for rotation therewith, and is preferably keyed to the shaft by a key 108. Element 90, plate 82 and plate 96 form an assembly which is essentially fluid tight and which defines a fluid chamber 110 connected to a source of fluid, preferably air under pressure, by passages 112 and 114 in shaft 30, 112 being connected to a coupling 116 mounted on the end of the shaft, and through a conduit (not shown) to the source of controlled air pressure.

The position of flange 70 is varied with respect to flange 60 to vary the pitch of the sheave, by varying the pressure in chamber 110 through the control system which regulates the flow of air into and from the chamber through passages 112 and 114. While fluids other than air may be used, the preferred embodiment utilizes air pressure for controlling the pressure in chamber 110 to vary the position of sheave flange 70.

In addition to functioning as the actuator for positioning flange 70 along shaft 30, element 90 also serves as a torque transmitting element between shaft 30 and flange 70. The components for transmitting this torque consist of flange plate 96 secured rigidly to shaft 30, element 90, and plate 82 rigidly connected to flange 70. The flange 70 is not connected to the shaft by a key or spline but, except for the element 90, is free to rotate on shaft 30. Any appreciable rotation between the shaft 30 and flange 70 is prevented by the coupling effect of element 90 between the shaft and the flange. The element is preferably constructed of rubber or rubber-like material with interspersed layers of fabric so that the two side walls of the element will expand and contract freely laterally, without the diameter of the element increasing or decreasing appreciably, as the pressure in chamber 110 is varied in the operation of varying the position of flange 70 on shaft 30. The chamber 110 is sealed along shaft 30 by seal 120 disposed in the end of hub 72 and seal 122 disposed in the adjacent end of the hub of plate 96. Since the beads 92 and 98 on opposite sides of element 90 form a seal with the peripheral portions of plates 82 and 96, chamber 110 is completely closed with the exception of passages 112 and 114.

The sheave assembly 16 consists of a fixed flange 130 mounted on shaft 132 and secured thereto by a key or the like interposed between hub or bushing 134 of the flange and the shaft, and a moveable flange 136 mounted on the shaft for axial and rotational movement thereon. The shaft is supported by pillow blocks 140 and 142 bolted by a plurality of bolts 144 to upper flange 26 of base 20, the shaft being journaled in bearings 146 and 148 of pillow blocks 140 and 142, respectively. The shaft, which has shoulders 150 and 152 adjacent bearings 146 and 148 to prevent axial movement of the shaft, extends outwardly beyond the two bearings to permit the shaft to be coupled at either end to the equipment to be driven. Moveable flange 136 is constantly urged toward the other flange by a coil spring 154 disposed around hub 138 and reacting between the external surface of the flange and a cam assembly indicated generally by numeral 160. Thus, when flange 70 of the sheave assembly 12 is changed by moving flange 70 toward flange 60 to increase the speed of the drive, the pressure applied by the belt as a result of the movement of flange 70 causes flange 136 to move away from flange 130, and when flange 70 is moved away from flange 60, the relief of pressure by the belt on flanges 130 and 136 permits the spring to move the flange 136 axially toward flange 130.

In order to assist in maintaining the proper position of flange 136 relative to flange 130 for any given selected speed of sheave assembly 12, and thereby assist in obtaining the desired torque output without slippage of the belt, a cam assembly 160 is utilized which includes a cam element 162 having a plurality of cam surfaces 164 thereon for engaging a plurality of respective cam followers 166 mounted on lugs 168 on the external surface of moveable flange 136. As the load increases, additional force is applied to the belt and flange 136, which in turn causes the cam followers to move up the respective cam surfaces 164 to prevent flange 136 from moving excessively away from flange 130 under the influence of heavy loading of the drive. The cam 160 is rigidly secured to shaft 132 by a bushing 170 and a plurality of screws 172 extending through a flange on the bushing into the cam. A key 174 is provided between bushing 170 and the shaft so that the cam is firmly secured to the shaft against both axial and angular movement relative thereto.

In the operation of the present variable speed V-belt drive as described herein in detail, the motor 14 drives shaft 30 through coupling 46, which in turn drives sheave flanges 60 and 70 and belt 18. Belt 18 transmits the torque from sheave assembly 12 to sheave assembly 16, which in turn drives shaft 132 and the equipment or machinery connected thereto. The desired speed and torque output of the drive are controlled by the pressure in chamber 110, which positions flange 70 axially on shaft 30 with respect to flange 60, thereby varying the pitch of the sheave. As flange 70 is moved toward flange 60, the belt moves outwardly toward the periphery of the two flanges, thus causing the belt to apply a greater force on flanges 130 and 136 and causing the moveable flange 136 to move to the left as viewed in FIGS. 3 and 4 against spring 154, thus decreasing the output speed of the drive. An adjustment can be made at any time during the operation of the drive by varying the pressure transmitted through passages 112 and 114 to chamber 110 from the pressure control system (not shown).

In the event the drive is placed under load, the drive automatically compensates for the additional load by the operation of the cam assembly 160 wherein the cam follower 166 travels relative to the cam surface 164 holding moveable flange 136 in the proper position to maintain the desired output speed regardless of the increased load on the drive. This retains the belt tight and the required pressure of the belt on the flanges of sheave assembly 16 for optimum power output. One of the advantages of the present assembly 80 is the fact that no keys or splines are used for operationally connecting shaft 30 to flange 70. This minimizes fretting and binding, which often occur in this type of drive when keys or splines are used to prevent relative rotation between a flange such as flange 70 and the shaft on which it is mounted. The plastic bushings 74 and 76 also facilitate free movement of flange 70 and hub 72 on the shaft, and hence prolong the optimum operation of the drive.

While only one embodiment of the present variable speed V-belt drive has been described in detail herein, various changes and modifications may be made without departing from the scope of the invention.

We claim:

1. In a variable speed belt drive: a shaft, a sheave mounted on said shaft and having an axially moveable flange, a flexible annular member surrounding the axis of said shaft and defining a fluid pressure chamber for a control fluid for adjusting the position of said moveable flange axially on said shaft, passage means for connecting said chamber to a control pressure, means connecting one axial edge of said annular member to said shaft for transmitting torque between said shaft and said annular member, and means connecting another axial edge of said annular member to said axially moveable flange for transmitting torque between said annular member and said moveable flange, said member and pair of means forming a drive connection between said shaft and said moveable flange.

2. In a variable speed belt drive as defined in claim 1, in which said sheave has a flange connected rigidly to said shaft, and said means connecting one axial edge of said flexible annular member to said shaft consists of an end member having a hub mounted on and rigidly secured to said shaft for rotation therewith.

3. In a variable speed belt drive as defined in claim 2, in which the cross sectional shape of said flexible annular member is of a generally U-shaped configuration having inwardly extending side walls, one of said side walls being connected to said moveable flange and the other of said side walls being connected to said end member near the periphery thereof.

4. In a variable speed belt drive as defined in claim 3, in which said flexible annular member in part defines the fluid pressure chamber wherein the pressure is varied to expand and contract said chamber to vary the distance between said moveable flange and said end plate member.

5. In a variable speed belt drive as defined in claim 4, in which said shaft has a smooth peripheral surface and said moveable flange includes a hub moveable angularly relative to said shaft and said angular movement is limited by said flexible element so that said moveable flange rotates with said shaft.

6. In a variable speed belt drive as defined in claim 1, in which said shaft has a smooth peripheral surface, and said moveable flange includes a hub moveable angularly relative to said shaft and said angular movement is limited by said flexible annular member so that said moveable flange rotates with said shaft.

7. A sheave comprising two flanges, one of said flanges being moveable axially relative to the other of said flanges, a cylindrical means disposed axially with respect to said flanges and having said moveable flange mounted thereon for axial movement with respect to said cylindrical means, an annular expandable and contractible member mounted axially with respect to said cylindrical means and having a fluid pressure chamber therein, means connecting one edge of said member to said cylindrical means for transmitting torque between said cylindrical means and said member, means connecting another edge of said member to said moveable flange for transmitting torque between said member and moveable flange, and passage means for connecting said chamber with a control pressure for adjusting the axial position of said moveable flange on said cylindrical means relative to said other flange.

8. A sheave as defined in claim 7 in which the other of said flanges is connected rigidly to said cylindrical means, and said means connecting one edge of said annular member to said cylindrical means consists of an end member having a hub mounted on and rigidly secured to said cylindrical means for rotation therewith.

9. A sheave as defined in claim 8 in which the cross sectional shape of said annular member is of a generally U-shaped configuration having inwardly extending side walls, one of said side walls being connected to said moveable flange and the other of said side walls being connected to said end member near the periphery thereof.

10. A sheave as defined in claim 9 in which said fluid pressure chamber is connected by passages in said cylindrical means to a control pressure for varying the axial position of said moveable flange on said cylindrical means in response to variations in the control pressure.

11. A sheave as defined in claim 10, in which said cylindrical means has a smooth peripheral surface, and said moveable flange and cylindrical means are connected by said annular member so that said moveable flange rotates with said cylindrical means.

12. A sheave as defined in claim 7 in which said cylindrical means has a smooth peripheral surface, and said moveable flange and cylindrical means are connected by said annular member so that said moveable flange rotates with said cylindrical means.

13. In a variable speed belt drive: a shaft, a sheave mounted on said shaft and having an axially moveable flange, a flexible annular member surrounding the axis of said shaft and defining a chamber for a control fluid, means connecting one axial edge of said annular member to said shaft for transmitting torque between said shaft and said annular member, and means connecting another axial edge of said annular member to said axially moveable flange for transmitting torque between said annular member and said moveable flange, said member and pair of means forming a drive connection between said shaft and said moveable flange, and passage means for connecting said chamber with a control pressure for adjusting the axial position of said moveable flange relative to said shaft.

14. In a variable speed belt drive as defined in claim 13, in which said moveable flange has a hub, and the surface of said shaft on which said hub moves is smooth and cylindrical, and the torque is transmitted from said shaft to said moveable flange through said flexible annular member.

15. In a variable speed belt drive as defined in claim 14, in which the sole driving connection between said shaft and said moveable flange is through said flexible annular member.

16. A variable pitch sheave comprising two flanges, one of which is moveable axially relative to the other, a rotatable cylindrical means disposed axially with respect to said flanges and having said moveable flange mounted thereon for axial movement relative to said other flange, a flexible annular member disposed axially with respect to said cylindrical means and said moveable flange and defining a chamber for a control fluid, means connecting one side of said member to said cylindrical means, and means connecting another side of said member to said moveable flange, whereby said annular member transmits torque between said cylindrical means and said moveable flange and varies the axial position of said moveable flange relative to said other flange in response to changes in pressure of the control fluid in said chamber.

17. A variable pitch sheave as defined in claim 16, in which said moveable flange has a hub and said cylindrical means on which said hub moves has a smooth cylindrical surface.

18. A variable pitch sheave as defined in claim 17, in which the sole driving connection between said cylindrical means and said moveable flange is through said flexible annular member.

19. A variable pitch sheave as defined in claim 16 in which an end member is secured to said cylindrical means, and the cross sectional shape of said annular member is of a generally U-shaped configuration having inwardly extending side walls, one of said side walls being connected to said moveable flange and the other of said side walls being connected to said end member near the periphery thereof.

* * * * *